Figure 1:
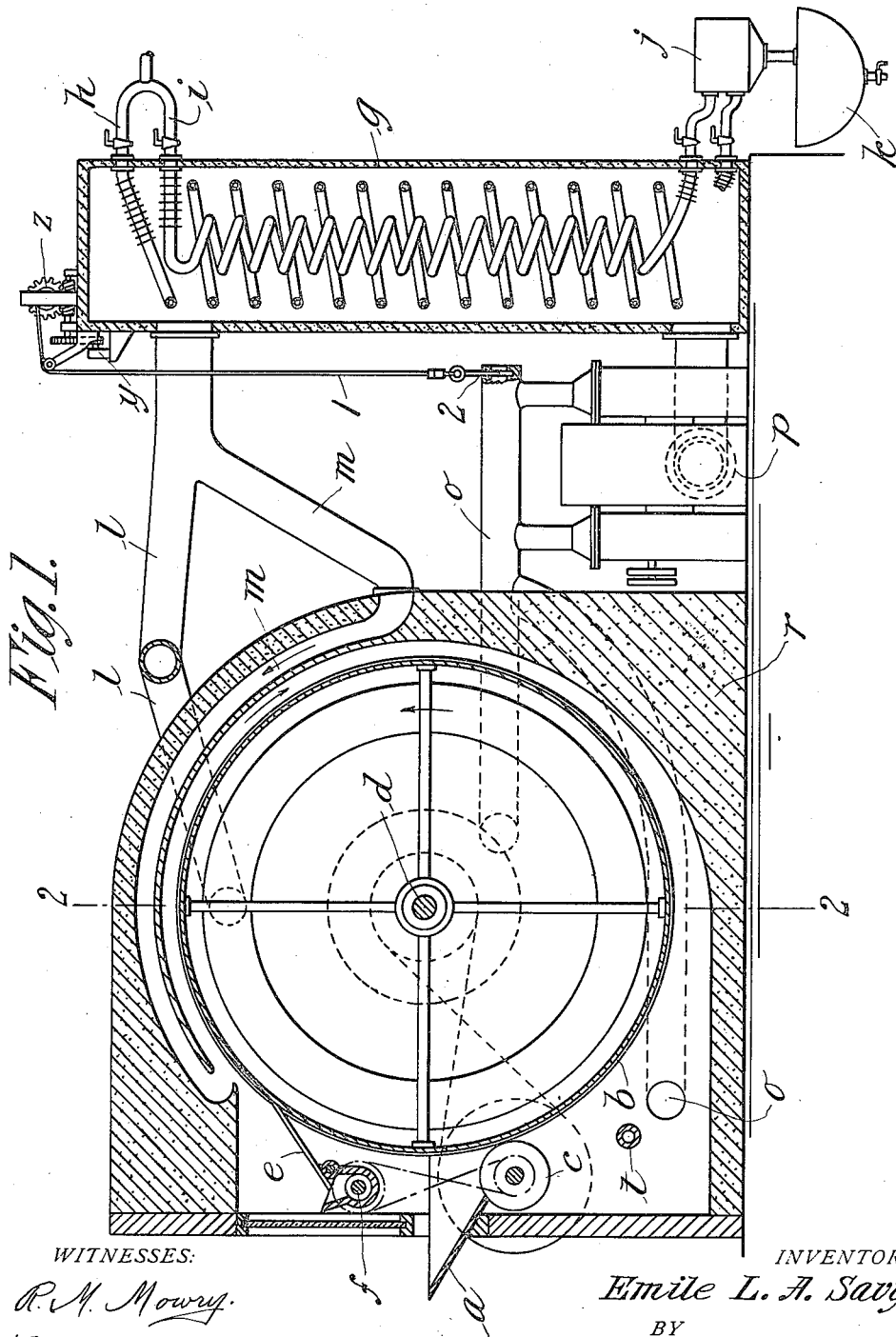

E. L. A. SAVY.
PROCESS OF CARAMELING CHOCOLATE.
APPLICATION FILED APR. 30, 1913.

1,173,873.

Patented Feb. 29, 1916.
2 SHEETS—SHEET 1.

WITNESSES:
R. M. Mowry.
W. P. Noble.

INVENTOR,
Emile L. A. Savy,
BY
Claspin & Co.
ATTORNEYS

E. L. A. SAVY.
PROCESS OF CARAMELING CHOCOLATE.
APPLICATION FILED APR. 30, 1913.
1,173,873.
Patented Feb. 29, 1916.
2 SHEETS—SHEET 2.
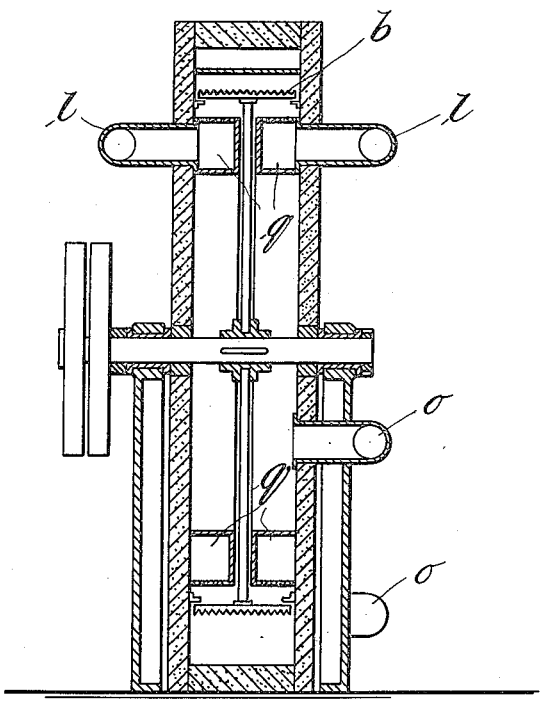
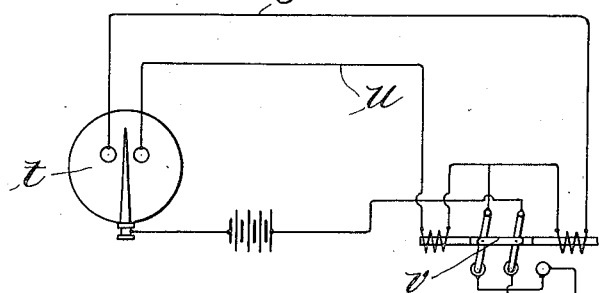
WITNESSES:
R. M. Mowry.
W. P. Noble.
INVENTOR,
Emile L. A. Savy,
BY
ATTORNEYS

UNITED STATES PATENT OFFICE.

EMILE LOUIS ALFRED SAVY, OF COURBEVOIE, FRANCE.

PROCESS OF CARAMELING CHOCOLATE.

1,173,873.  Specification of Letters Patent.  Patented Feb. 29, 1916.

Application filed April 30, 1913. Serial No. 764,566.

*To all whom it may concern:*

Be it known that I, EMILE LOUIS ALFRED SAVY, a citizen of the Republic of France, residing at Courbevoie, Le Department de la Seine, France, have invented a new and Improved Process of Carameling Chocolate, of which the following is a specification.

This invention relates to a process of carameling chocolate.

Chocolate has heretofore been subjected to a carameling process. In the process the chocolate is raised to a rather high temperature, which causes its taste to change, as well as improves its keeping qualities and renders it smoother than it otherwise would be at that stage at which it melts freely when eaten. These results are due, as far as now known, to the transformation of the sugar into a caramel combined with the cocoa-butter in the chocolate by the action of the heat, the sugar in the mixture becoming uncrystallizable as the mixture cools. This process of carameling chocolate has been carried on commercially for a long time.

Various apparatus are now used by the manufacturer to obtain the desired quality of chocolate from the process. These usually comprise kettles or mixing vats with double bottoms whereby the mixture in the kettle is heated. This mixture is kept in constant movement in the kettles for between seventy or eighty hours so that all of the parts of the mixture are brought into contact with the heated walls of the kettle as well as into contact with the air. The latter has a very marked oxidizing effect on the mixture, which effect is an important factor in developing the desired taste or flavor. When the process is carried out by means of the apparatus and in the manner stated, serious faults result other than the long time and large amount of power required. The most serious fault is the liberating from the chocolate of a quantity of cocoa-butter greater than is absolutely necessary to obtain the smoothness desired in the material.

Applicant has made a study of the process of carameling chocolate and has found that the process can be carried out in a new manner which will avoid the faults resulting from the process as heretofore carried out. In applicant's process the particular apparatus used is not essential as the process can be carried out in many forms of apparatus. The new process is described with the preferred form of apparatus, for the purpose of disclosing the desired method of using the process.

The object of the invention is to provide a process of carameling chocolate in a shorter space of time than has heretofore been necessary.

Another object is to provide a process of carameling chocolate in a convenient manner.

Still another object is to provide a process of carameling chocolate without liberating from the chocolate as much cocoa-butter as is liberated by the methods heretofore in use.

A further object is to provide a process combining the objects heretofore stated, all as pointed out in the following description and annexed claims.

With these objects in view, the process preferably used consists in submitting the chocolate mixture, preferably milled as fine as possible, to a temperature of between 100° and 140° centigrade applied to the mixture by means of a current of hot air. The best results have been found where the mixture is subjected to the current of hot air over a large area as compared to the volume of the mixture. The hot air thus comes in contact with all parts of the mixture, whereby the proper number of calories is transferred and the oxidizing effect produced more rapidly than in the old process. The current of hot air can be applied to a large area of the mixture to carry out the process by the use of many specific forms of apparatus, the preferred form which has brought about the desired results will be described.

Referring to the figures.—Figure 1 is a side sectional elevation of the apparatus. Fig. 2 is a section through Fig. 1 along line 2—2 of that figure. Fig. 3 is a diagram showing an electric control system in a thermostat arrangement used in the machine.

The chocolate mixture is fed in the hopper $a$ from which it is transferred in a thin sheet to the channeled rotatable drum $b$. This transfer is aided by the rotating tangential wheel $c$ at the mouth of the hopper. Drum $b$ is mounted on axis $d$ in the heat-retaining casing shown. As the drum rotates counter-clockwise, it carries a thin sheet of chocolate on its periphery and in its channels to the discharge-plate $e$. This plate rests at an angle on the periphery of the drum fitting in the channels and it scrapes the chocolate from the drum. The rotating discharge-screw $f$ receives the chocolate and transfers it to a suitable point, at the same time stirring it to free the air therefrom. During this passage of the chocolate on the drum from the feeding to discharge points, it is subjected to a current of hot air maintained at an approximately constant temperature.

The heating system of the apparatus embodies a main heating chamber $g$ in which are two coils of steam pipes $h$ and $i$ connected to a steam-trap $j$ with a separator $k$ attached to the latter. The pipes are provided with radiating fins or plates to give a large heating surface. Valves are placed in the pipes to put one or both pipes out of commission. The air in casing $g$ is heated by the steam pipes, then forced through conducting-pipes $l$ and $m$ to each side of the channeled periphery of drum $b$. The pipe $m$ conducts the heated air through a certain arc above the drum, after which the air turns to flow between the drum and the bottom of passage $m$, which tends to keep its temperature constant. It then flows in contact with the chocolate to the outlet-pipe $o$, then to the fan-apparatus $p$, which returns it to chamber $g$ to be reheated. During the passage of the hot air in contact with the chocolate on the drum in a direction opposite to the rotation of the drum, the desired process is being carried on, for the chocolate in a thin stream is subjected to the desired temperature by a current of hot air.

It is found desirable to heat the inner side of the drum surface. This is done by the air from casing $g$ passing through pipes 1 to the annular chambers $q$ (see Fig. 2) extending around inside the drum, as shown in Figs. 1 and 2. The air is directed against the inner surface of the drum through small holes, after which it passes to outlet-pipe $o$ and to the fan-apparatus $p$. By the means described a current of hot air passes through a cycle of operations to maintain a proper temperature in the casing $r$. This temperature is maintained approximately constant by a thermostat system.

A thermostat element $t$ (see Figs. 1 and 3) is placed in the casing $r$ near the outlet $o$. Any change in temperature from that desired will cause the indicating-hand of the thermostat to close circuits $s$ or $u$ and throw double-switch $v$ to send the current from a suitable source in one direction or the other through motor $y$. This motor is mounted as shown in Fig. 1 and geared to turn a drum to wind or unwind a rope 1 controlling inlet-valve 2. The latter, when open, allows cold air to be introduced into the circulating system. The automatic regulation of the inlet-valve 2 will keep the temperature of the circulating air at the proper degree.

The time during which the chocolate mixture is subjected to the temperature of 100 to 140° centigrade is controlled by the speed of the drum $b$. This is regulated by any suitable gearing. It has been found, in carrying out the process as described, that although the old method required a good many hours—for example, between seventy and eighty hours,—the newly-discovered process only requires a fraction of this time. The exact time can be determined readily after the apparatus is started by regulating the speed of the drum until the desired product is obtained. This saving of the time in the carrying out of the process is an important feature of the invention. Since the temperature is maintained constant and the proper speed can be determined and maintained, the continuous and uniform caramelizing of chocolate results in a great quantity of chocolate of the desired grade produced in a minimum of time.

What I claim, is,—

1. The process of carameling chocolate, consisting in subjecting the chocolate to a high temperature by the application of hot air to the chocolate, whereby the chocolate is brought into contact with the air and the heat given to the chocolate to produce the carameling effect in a short time.

2. The process of carameling chocolate, consisting in subjecting a thin sheet of the chocolate to a uniform temperature while in contact with the air whereby the carameling effect is produced in a short time.

3. The process of carameling chocolate, consisting in subjecting a continuously-moving sheet of chocolate to an approximately constant temperature of high degree while in contact with the air.

4. A process of carameling chocolate which consists in drawing out a portion of the liquid chocolate into a thin sheet and in blowing a current of heated air upon the sheet in the direction opposite to the direction of the travel of the sheet.

5. The process of carameling chocolate or the like consisting in spreading pasty or thick chocolate out in a thin layer on a suitable surface and then heating the thin layer to a temperature of from 100° to 140° C.

EMILE LOUIS ALFRED SAVY. [L. S.]

Witnesses:
  LUCIEN MEMMINGER,
  JOHN BAKER.